United States Patent
Kim

(10) Patent No.: US 9,961,327 B2
(45) Date of Patent: May 1, 2018

(54) METHOD FOR EXTRACTING EYE CENTER POINT

(71) Applicant: Hyundai Motor Company, Seoul (KR)

(72) Inventor: Yang Shin Kim, Gyeongsangnam-do (KR)

(73) Assignee: Hyundai Motor Company, Seoul (KR)

( * ) Notice: Subject to any disclaimer, the term of this patent is extended or adjusted under 35 U.S.C. 154(b) by 766 days.

(21) Appl. No.: 14/508,232

(22) Filed: Oct. 7, 2014

(65) Prior Publication Data

US 2015/0365650 A1    Dec. 17, 2015

(30) Foreign Application Priority Data

Jun. 16, 2014    (KR) ......................... 10-2014-0072986

(51) Int. Cl.
   *H04N 13/02*    (2006.01)
   *G06K 9/00*    (2006.01)

(52) U.S. Cl.
   CPC ....... *H04N 13/0239* (2013.01); *G06K 9/0061* (2013.01)

(58) Field of Classification Search
   CPC ......................... H04N 13/0239; G06K 9/0061
   USPC ......................................................... 348/47
   See application file for complete search history.

(56) References Cited

U.S. PATENT DOCUMENTS

| | | | | |
|---|---|---|---|---|
| 9,237,844 | B2 * | 1/2016 | De Bruijn | A61B 3/113 |
| 2005/0249377 | A1 * | 11/2005 | Fouquet | G01J 3/10 |
| | | | | 382/103 |
| 2005/0249384 | A1 * | 11/2005 | Fouquet | G01J 3/26 |
| | | | | 382/117 |
| 2006/0038881 | A1 * | 2/2006 | Starkweather | H04N 13/0402 |
| | | | | 348/51 |
| 2009/0304232 | A1 * | 12/2009 | Tsukizawa | A61B 3/113 |
| | | | | 382/103 |
| 2010/0259746 | A1 | 10/2010 | Ohnishi et al. | |

(Continued)

FOREIGN PATENT DOCUMENTS

| | | |
|---|---|---|
| CN | 1704776 A | 12/2005 |
| CN | 102388291 A | 3/2012 |
| JP | 5137833 B2 | 2/2013 |

(Continued)

OTHER PUBLICATIONS

Chinese Office Action from the Patent Office of the People's Republic of China for Chinese Patent Application No. 201410563213.5, dated Dec. 5, 2017, 11 pages.

*Primary Examiner* — Jeremaiah C Hallenbeck-Huber
(74) *Attorney, Agent, or Firm* — Mintz Levin Cohn Ferris Glovsky and Popeo, P.C.; Peter F. Corless

(57) ABSTRACT

A method for extracting an eye center point includes: photographing a left eye using a left camera resulting in a left eye image; extracting a light reflection point from the left eye image using a first lighting; extracting a first reflection point which is the brightest point on a horizontal line of the light reflection point using a second lighting; photographing the left eye using a right camera; extracting a second reflection point and a third reflection point from an epipolar line by computing an epipolar line of an image corresponding to the light reflection point using the first lighting and the second lighting; and extracting the eye center point using the light reflection point, the first reflection point, the second reflection point, and the third reflection point.

5 Claims, 3 Drawing Sheets

(56) References Cited

U.S. PATENT DOCUMENTS

2012/0044504 A1* 2/2012 Ohnishi ................ G01B 11/24
356/602
2014/0313308 A1* 10/2014 Wang ................ G06K 9/00604
348/78

FOREIGN PATENT DOCUMENTS

| KR | 10-2006-0105271 A | 10/2006 |
| KR | 10-2012-0055011 | 5/2012 |
| KR | 10-1255219 | 4/2013 |
| KR | 10-2014-0000833 | 1/2014 |

* cited by examiner

METHOD FOR EXTRACTING EYE CENTER POINT

CROSS-REFERENCE TO RELATED APPLICATION

This application claims the benefit of and priority to Korean Patent Application No. 10-2014-0072986, filed on Jun. 16, 2014 in the Korean Intellectual Property Office, the disclosure of which is incorporated herein in its entirety by reference.

TECHNICAL FIELD

The present disclosure relates to a method for extracting an eye center point, and more particularly, to a technology for efficiently extracting an eye center point by using an epipolar line.

BACKGROUND

Eyesight, which is one of the five senses for obtaining information on a surrounding environment, may perceive a location and perspective of an object through a viewer's two eyes. That is, visual information obtained by the two eyes is synthesized as single distance information to make people freely move.

By implementing the above-mentioned visual structure in a machine, a robot capable of replacing a human has been developed. In this regard, a visual system of such robot includes a stereo camera (i.e., a left camera and a right camera) and reads images from the two cameras to reconstruct the read images as three-dimensional image information.

In this case, an image can be obtained by projecting a three-dimensional space onto a two-dimensional space. In this process, because three-dimensional distance information (e.g., depth) is lost, it is difficult to directly restore the three-dimensional space from the two-dimensional space. However, if two or more images obtained from different positions are present, the three-dimensional space may be restored. That is, in a case where one point on real space focuses on the two images, by finding a corresponding point located in the two images and using a geometrical structure, a position in real space of the one point may be found.

Although finding the corresponding point in the two images (hereinafter, referred to as "stereo matching") is can be difficult work, it can also be an important technology for estimating and restoring the three-dimensional space. The stereo matching may produce many forms of results, and thus, it can be difficult to find only the result representing the real space among all results.

The stereo matching technology is generally based on a markov random field (MRF) model. The two-dimensional field model transforms a modeling of complex object into a simple and region-related probability model, but the MRF model performs complex computations and results in uncertain boundaries.

Meanwhile, as stereo matching technology is based on a high-speed processing, dynamic programming technology has a trellis structure, and may perform a significantly more rapid and accurate stereo matching. However, because the dynamic programming technology performs the matching through a search only in a single scan line, it does not consider the results of lower and upper columns, thereby causing significant stripe noise. Further, the stereo matching of all columns can be independently performed, such that the results of upper and lower rows are different from the result of a current row.

In order to reduce the above-mentioned noise, a median filter, an average value filter, or the like are used in an image processing. But because it is used for each frame, association with a previous frame is not considered. Therefore, due to the noise which is changed for each frame, it becomes difficult to extract a stable depth image.

SUMMARY

The present disclosure has been made to solve the above-mentioned problems occurring in the related art while advantages achieved by the related art are maintained intact.

An aspect of the present disclosure provides a method for extracting an eye center point capable of calculating the eye center point by using reflection points in which lighting is reflected from eye using a gaze tracker, including a stereo camera, and capable of improving performance of the gaze tracker by reducing a computational time of calculating the eye center point.

According to an embodiment of the present disclosure, a method for extracting an eye center point includes: photographing a left eye image using a left camera; extracting a light reflection point from an image obtained by photographing a left eye using a first lighting; extracting a first reflection point which is the brightest point on a horizontal line of the lighting reflection point using a second lighting; photographing the left eye image using a right camera; extracting a second reflection point and a third reflection point from an epipolar line by computing the epipolar line of an image corresponding to the lighting reflection point using the first lighting and the second lighting; and extracting the eye center point using the light reflection point, the first reflection point, the second reflection point, and the third reflection point.

The method may further include, after the extracting of the left eye center point by photographing the left eye image using the left and right cameras, extracting a right eye center point by photographing a right eye image. The second reflection point may be extracted from an epipolar line by computing the epipolar line of an image corresponding to the lighting reflection point by using the first lighting. The third reflection point may be extracted from an epipolar line by computing the epipolar line of an image corresponding to the lighting reflection point by using the second lighting. The first reflection point, the second reflection point, and the third reflection point may be extracted by binary-coding pixel value in images generated by the first lighting and the second lighting based on brightness having a value equal to or larger than a threshold set by a user.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

The above-mentioned objects, features, and advantages will become obvious from the detailed description which is described below in detail with reference to the accompanying drawings. Therefore, those skilled in the art to which the present disclosure pertains may easily practice a technical idea of the present disclosure. Hereinafter, embodiments of the present disclosure will be described in detail with reference to the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
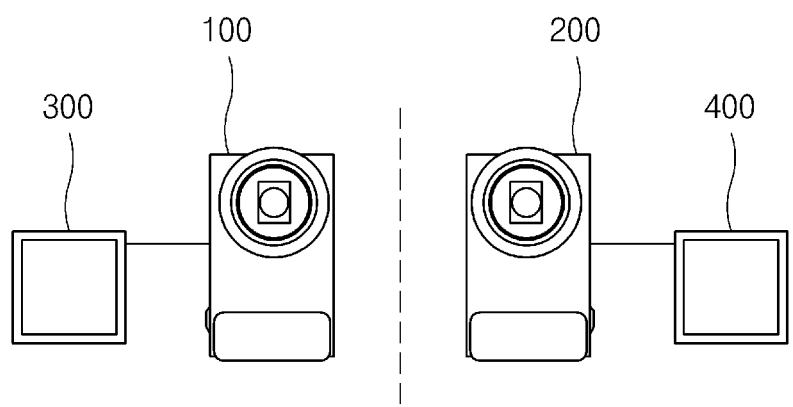
FIG. 1 is a diagram showing a camera and a lighting for extracting an eye center point according to an embodiment of the present disclosure.

FIG. 1 is a diagram showing a camera and a lighting for extracting an eye center point according to an embodiment of the present disclosure.

Referring to FIG. 1, a stereo apparatus according to an embodiment of the present disclosure includes a first camera 100 and a second camera 200, wherein the first camera 100 and the second camera 200 may be provided with a first lighting 300 and a second lighting 400, respectively. Here, the first camera 100 and the second camera 200 are alternately referred to as a left camera and a right camera, photographing a subject using a module, or the like. That is, the first camera 100, which is the left camera, photographs a first image (e.g., a left eye image) together with the first lighting 300 and the second lighting 400, while the second camera 200, which is the right camera, photographs a second image (e.g., a left eye image) together with the first lighting 300 and the second lighting 400. Then, a reflection point may be calculated by performing a projection for the second image using an epipolar line of a lighting reflection point extracted from the first image.

Next, the first camera 100, which is the left camera, photographs a third image (e.g., a right eye image) together with the first lighting 300 and the second lighting 400, while the second camera 200, which is the right camera, photographs a fourth image (e.g., a right eye image) together with the first lighting 300 and the second lighting 400. Then, similar to the above, a reflection point may be calculated by performing a projection for the fourth image using an epipolar line of a lighting reflection point extracted from the third image.

Figure 2:
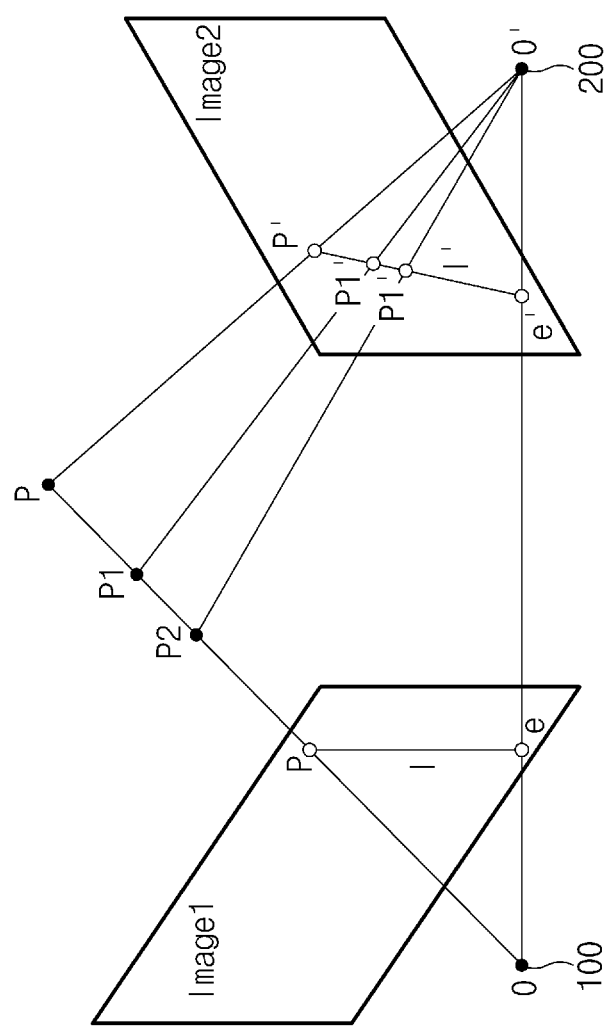
FIG. 2 is a diagram illustrating an epipolar line for estimating three-dimensional information according to an embodiment of the present disclosure.

FIG. 2 is a diagram illustrating an epipolar line for estimating three-dimensional information according to an embodiment of the present disclosure.

Referring to FIG. 2, a stereo matching process, which reconfigures a three-dimensional space from a two-dimensional left image and right image, that is, a stereo image, finds corresponding points from the two two-dimensional images and estimates three-dimensional information using a geometrical relationship between the corresponding points. For example, as shown in FIG. 2, in order to find the corresponding points from the two two-dimensional images and estimate the three-dimensional information using the geometrical relationship between the corresponding points, a point corresponding to one point P of one image (e.g., "image1") in a stereo image needs to be found from the other image (e.g., "image 2"). Notably, points (e.g., P', P1', P2') are on the epipolar line of the corresponding image (image2) for the point P in the reference image (image1), and if a rectification is performed for the epipolar line, the stereo matching may be performed by checking only two single scan lines which are horizontally spread.

Figure 3:
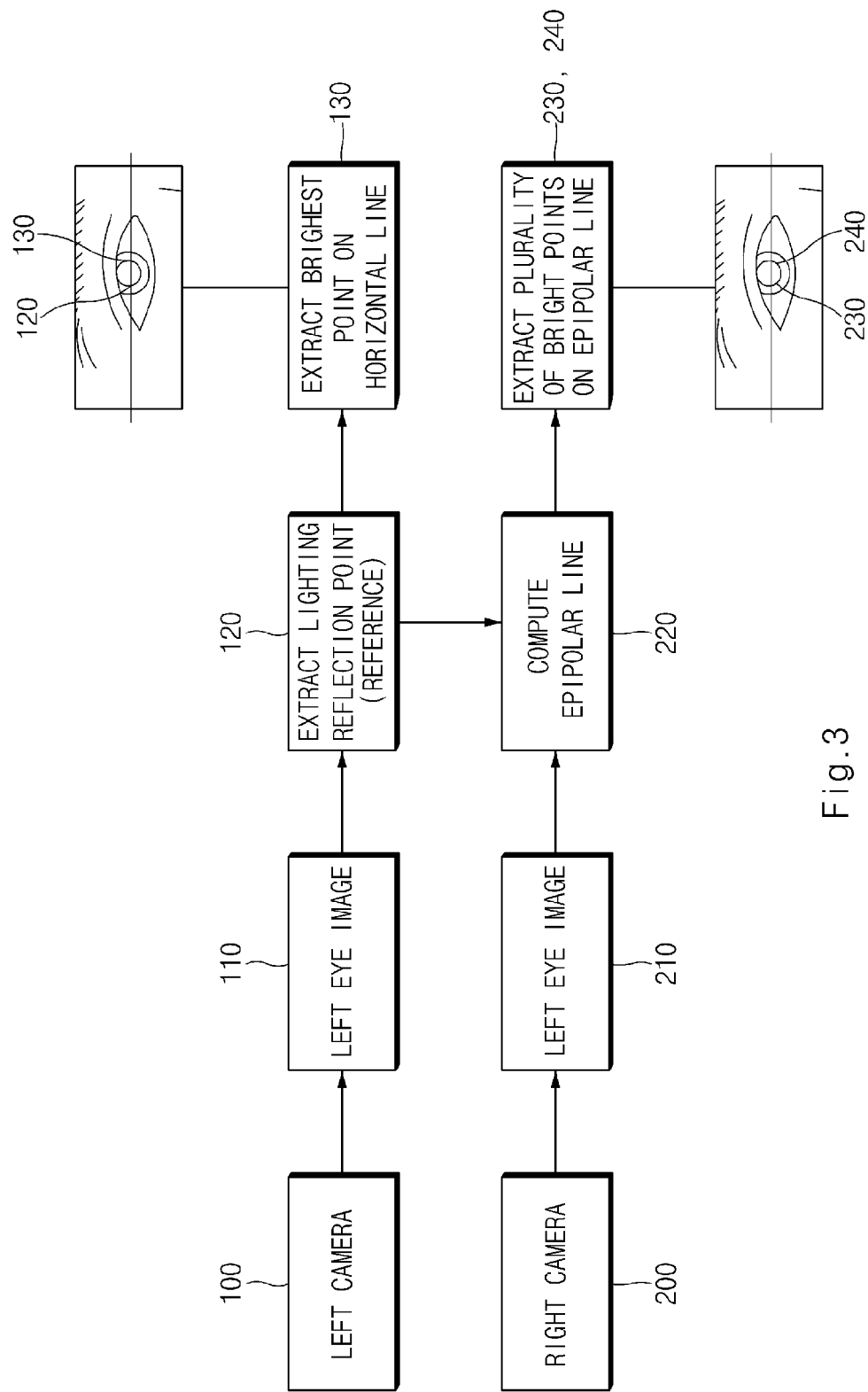
FIG. 3 is a diagram describing a method for extracting an eye center point according to an embodiment of the present disclosure.

FIG. 3 is a diagram describing a method for extracting an eye center point according to an embodiment of the present disclosure.

Referring to FIG. 3, a stereo apparatus according to an embodiment of the present disclosure includes a first camera and a second camera, wherein the first camera and the second camera may be provided with a first lighting and a second lighting, respectively. For the purposes of FIG. 3, the first camera is defined as a left camera 100, and the second camera is defined as a right camera 200.

As a first example, four reflection points may be extracted from an image obtained by photographing the left eye using the stereo camera and the lighting. A left eye image 110 is photographed by using the left camera 100. In this case, a lighting reflection point 120 (e.g., reference point) may be extracted from the image obtained by photographing the left eye using the first lighting. Because a method for extracting the lighting reflection point 120 can be a general method of using the lighting and extracting the lighting reflection point 120 from the image obtained by photographing the eye, a detailed description thereof will be omitted.

Next, after the lighting reflection point 120 is extracted, the brightest point on a horizontal line of the lighting reflection point 120 is extracted using the second lighting. The brightest point may be a first reflection point 130. Next, a left eye image 210 is photographed using the right camera 200. In this case, a plurality of bright points are extracted from an epipolar line 220 by computing the epipolar line 220 of the corresponding image for the lighting reflection point 120 from the image obtained by photographing the left eye using the first lighting and the second lighting. The plurality of bright points may be points having brightness similar to the lighting reflection point 120. The plurality of bright points may be a second reflection point 230 and a third reflection point 240.

Here, if a pixel value in the image generated by the lighting is binary-coded based on a brightness of a certain amount (e.g., a threshold brightness set by a user) or more, the lighting reflection point 120, the first reflection point 130, the second reflection point 230, and the third reflection point 240 may be extracted. For example, a value of a threshold amount or more may have a value of 255, and a value less than the threshold amount may have a value of 0. A left eye center point may be calculated using four reflection points from the image obtained by photographing the left eye using the stereo camera and the lighting.

Specifically, a 3D coordinate A of the eye center point may be calculated by using the lighting reflection point 120 and the second reflection point 230 generated by the first lighting. Also, a 3D coordinate B thereof may be calculated using the first reflection point 130 and the third reflection point 240 generated by the second lighting. A point at which a straight line passing through the 3D coordinate A and a straight line passing through the 3D coordinate B intersect with each other may be extracted. The point at which the two straight lines intersect with each other is defined as the eye center point.

As a second example, four reflection points may be extracted from an image obtained by photographing the right eye using the stereo camera and the lighting. A right eye image is photographed by using the left camera. In this case, a lighting reflection point (e.g., reference point) may be extracted from the image obtained by photographing the right eye using the first lighting. Next, after the lighting reflection point is extracted, the brightest point on a horizontal line of the lighting reflection point is extracted using the second lighting. The brightest point may be a first reflection point.

Next, a right eye image is photographed using the right camera. In this case, a plurality of bright points are extracted from an epipolar line by computing the epipolar line of the corresponding image for the lighting reflection point from the image obtained by photographing the right eye using the first lighting and the second lighting. The plurality of bright points may be points having brightness similar to the lighting reflection point. The plurality of bright points may be a second reflection point and a third reflection point.

Here, if a pixel value in the image generated by the lighting is binary-coded based on a brightness of a certain amount (e.g., a threshold amount set by a user) or more, the lighting reflection point, the first reflection point, the second reflection point, and the third reflection point may be extracted. For example, a value of the threshold amount or more may have a value of 255, and a value less than the threshold amount may have a value of 0. A right eye center point may be calculated using four reflection points from the image obtained by photographing the right eye using the stereo camera and the lighting.

Specifically, a 3D coordinate A of the eye center point may be calculated using the lighting reflection point and the second reflection point generated by the first lighting, and a 3D coordinate B thereof may be calculated using the first reflection point and the third reflection point generated by the second lighting. A point at which a straight line passing through the 3D coordinate A and a straight line passing through the 3D coordinate B intersect with each other may be extracted, and the point at which the two straight lines intersect with each other is defined as the eye center point.

The present disclosure relates to a technology capable of extracting the lighting reflection points using the epipolar line generated from the geometrical relationship between the stereo camera (including the left camera and the right camera) and the plurality of lightings and calculating the eye center point using the extracted lighting reflection points. According to the present technology as described above, the eye center point may be calculated using the reflection points in which the lighting is reflected from the eye using a gaze tracker including a stereo camera and a suitable lighting apparatus, and the performance of the gaze tracker may be improved by reducing the computational time of calculating the eye center point.

Although the present disclosure has been described with reference to embodiments and the accompanying drawings, it should be appreciated by those skilled in the art that the scope of the present disclosure is not limited thereto but various modifications and alterations might be made without departing from the scope defined in the claims and their equivalents.

What is claimed is:

1. A method for extracting an eye center point, the method comprising:
   photographing a left eye using a left camera resulting in a left eye image;
   extracting a light reflection point from the left eye image using a first lighting;
   extracting a first reflection point which is a brightest point on a horizontal line of the light reflection point using a second lighting;
   photographing the left eye using a right camera;
   extracting a second reflection point and a third reflection point from an epipolar line by computing an epipolar line of an image corresponding to the light reflection point using the first lighting and the second lighting; and
   extracting a left eye center point using the light reflection point, the first reflection point, the second reflection point, and the third reflection point,
   wherein the first reflection point, the second reflection point, and the third reflection point are extracted by binary-coding a pixel value in images generated by the first lighting and the second lighting based on a brightness amount having a value equal to or larger than a threshold set by a user.

2. The method according to claim 1, further comprising, after the extracting of the left eye center point, extracting a right eye center point by photographing a right eye resulting in a right eye image.

3. The method according to claim 1, wherein the second reflection point is extracted from the epipolar line by computing the epipolar line of the image corresponding to the light reflection point using the first lighting.

4. The method according to claim 1, wherein the third reflection point is extracted from the epipolar line by computing the epipolar line of the image corresponding to the light reflection point using the second lighting.

5. A system for extracting an eye center point, the system comprising:
   a left camera that photographs a left eye resulting in a left eye image;
   a right camera that photographs the left eye;
   a first lighting that extracts a light reflection point from the left eye image; and
   a second lighting that extracts a first reflection point which is a brightest point on a horizontal line of the light reflection point, wherein
   a second reflection point and a third reflection point are extracted from an epipolar line by computing an epipolar line of an image corresponding to the light reflection point using the first lighting and the second lighting, and
   a left eye center point is extracted using the light reflection point, the first reflection point, the second reflection point, and the third reflection point,
   wherein the first reflection point, the second reflection point, and the third reflection point are extracted by binary-coding a pixel value in images generated by the first lighting and the second lighting based on a brightness amount having a value equal to or larger than a threshold set by a user.

* * * * *